United States Patent [19]
Chen et al.

[11] Patent Number: 5,830,584
[45] Date of Patent: *Nov. 3, 1998

[54] BICRYSTAL CLUSTER MAGNETIC RECORDING MEDIUM

[75] Inventors: Ga-Lane Chen, Fremont; Qixu Chen, Milpitas, both of Calif.

[73] Assignee: Seagate Technology, Inc., Scotts Valley, Calif.

[ * ] Notice: The term of this patent shall not extend beyond the expiration date of Pat. No. 5,733,370.

[21] Appl. No.: 586,571

[22] Filed: Jan. 16, 1996

[51] Int. Cl.$^6$ ........................................................ G11B 5/66
[52] U.S. Cl. .................... 428/611; 428/141; 428/65.3; 428/65.7; 428/216; 428/336; 428/457; 428/469; 428/662; 428/666; 428/667; 428/680; 428/694 T; 428/694 TS; 428/694 SG; 428/694 TP; 428/900; 428/928
[58] Field of Search ...................... 428/141, 216, 428/65.3, 65.7, 336, 662, 666, 667, 680, 457, 469, 694 T, 694 TS, 694 SG, 694 TP, 900, 928, 611

[56] References Cited

U.S. PATENT DOCUMENTS

| | | | |
|---|---|---|---|
| 4,833,020 | 5/1989 | Shiroishi et al. | 428/336 |
| 4,900,397 | 2/1990 | Werner et al. | 428/694 |
| 5,273,834 | 12/1993 | Hoover et al. | 156/643 |
| 5,302,434 | 4/1994 | Doerner et al. | 428/64 |
| 5,344,706 | 9/1994 | Lambeth et al. | 428/336 |
| 5,456,978 | 10/1995 | Lal et al. | 428/332 |
| 5,512,150 | 4/1996 | Bourez et al. | 204/192.2 |
| 5,569,533 | 10/1996 | Lal et al. | 428/332 |

OTHER PUBLICATIONS

Hosoe et al. "Bicrystal Cluster Structure and Magnetic Properties of CoCrTa/Cr Thin Film Media" IEEE Trans. Magn vol. 31 No. 6 Nov. 1995 pp. 2824–2826.

Peng et al "Micromagnetic and Experimental Studies of CoPtCr Polycrystalline Thin Film Media with Bicrystal Microstructure" IEEE Trans. Magn. vol. 31 No. 6 Nov. 1995 pp. 2821–2823.

Kojima et al "Grain Size Effect on Noise Properties in CoCrTa Thin Film Media" IEEE Trans. Magn. vol. 31 No. 6 Nov. 1995 pp. 2830–2832.

Wong et al., "Investigation of CoNiCr Thin Films Deposited on [1 100] and [110] Single Crystals," IEEE Trans. Magn. MAG–27, No. 6, Nov. 1991, pp. 4733–4735.

Mirzamaani et al., "Magnetic properties of CoPtCr thin films with <1120> crystal orientation," J. Appl. Phys. 69(8), Apr. 15, 1991, pp. 5169–5171.

Min et al., "Bicrystal advanced thin–film media for high density recording," J. Appl. Phys. 75(10), May 15, 1994, pp. 6129–6131.

Ding et al., "Microstructure and Recording Properties of Bicrystal Disks with GaAs Substrates," IEEE Trans. Magn. MAG–30, Nos. 6, Nov. 1994, pp. 3978–3980.

Futamoto et al., "Magnetic and Recording Characteristics of Bicrystalline Longitudinal Recording Medium Formed on an MGO Single Crystal Disk Substrate," IEEE Trans. Magn., MAG–30, No. 6, 1994, pp. 3975–3977.

Ye et al., "Modeling of thin–film media with advanced microstructure for ultrahigh density recording," J. Appl. Phys. 75(10), May 15, 1994, pp. 6135–6137.

(List continued on next page.)

*Primary Examiner*—Stevan A. Resan
*Attorney, Agent, or Firm*—McDermott, Will & Emery

[57] ABSTRACT

A magnetic recording medium having low medium noise and suitable for high density magnetic recording is produced with a bicrystal cluster magnetic layer on a glass or glass-ceramic substrate. An underlayer which is formed with a (200) crystallographic orientation induces the formation of a bicrystal cluster microstructure in a magnetic alloy layer epitaxially grown on the underlayer.

39 Claims, 6 Drawing Sheets

OTHER PUBLICATIONS

Nolan et al., "Effect of microstructural features o media noise in longitudinal recording media," J. Appl. Phys. 73(10), May 15, 1993, pp. 5566–5568.

Peng et al., "Micromagnetic and Experimental Studies of CoPtCr Bicrystal Thin Film Media," (JA–01, Intermag Conference, San Antonio, Texas, Apr. 1995).

Hosoe et al., "Bicrystal Cluster Structure and Magnetic Properties of CoCrTa/Cr Thin Film Media," (JA–02, Intermag Conference, San Antonio, Texas, Apr. 1995).

Ding et al.., "Fabrication and Recording Performances of Bicrystal Disks on GaAs Substrates," Journal of The Magnetics Society of Japan, vol. 18, Supple., No. S1 (1994).

Ding et al., "Experimental Study on Recording and Track Edge Characteristics of Bicrystal Thin Film Media," IEEE Trans. Magn., MAG–31, pp. 2827, 1995.

BICRYSTAL CLUSTER MAGNETIC RECORDING MEDIUM

TECHNICAL FIELD

The present invention relates to a magnetic recording medium, such as a thin film magnetic recording disk. The invention has particularly applicability to a low noise, high density, magnetic recording medium.

BACKGROUND ART

The requirements for high areal recording density impose increasingly greater requirements on thin film magnetic recording media in terms of coercivity, remanent squareness, low medium noise and narrow track recording performance. It is extremely difficult to produce a magnetic recording medium satisfying such demanding requirements, particularly a high density magnetic rigid disk medium for longitudinal recording.

The linear recording density can be increased by increasing the coercivity of the magnetic recording medium. However, this objective can only be accomplished by decreasing the medium noise, as by maintaining very fine magnetically noncoupled grains. Medium noise is a dominant factor restricting increased recording density of high density magnetic hard disk drives. Medium noise in thin films is attributed primarily to inhomogeneous grain size and intergranular exchange coupling. Therefore, in order to increase linear density, medium noise must be minimized by suitable microstructure control.

A conventional longitudinal recording disk medium is depicted in FIG. 1 and comprises a substrate 10, typically an aluminum (Al) alloy, such as an aluminum-magnesium (Al— Mg) alloy, plated with a layer of amorphous nickel-phosphorous (NiP). Substrate 10 generally contains sequentially deposited thereon a chromium (Cr) underlayer 11, a cobalt (Co)-based alloy magnetic layer 12, a protective carbon overcoat 13 and a lubricant 14. Cr underlayer 11, Co-based alloy magnetic layer 12, and protective carbon overcoat 13 are typically deposited by sputtering techniques. The Co-based alloy magnetic layer typically comprises polycrystallites epitaxially grown on a polycrystal Cr underlayer.

The conventional NiP plating on the Al-alloy substrate is provided primarily to increase the hardness of the Al-alloy substrate, thereby providing a suitable surface for polishing to provide the requisite surface roughness or texture. The NiP coating is typically applied by electroless plating to a thickness of about 15 micrometers.

Werner et al., U.S. Pat. No. 4,900,397, proposed the use of Radio Frequency (RF) sputter etching to remove surface deposits on a conventional NiP coating of Alalloy substrates, followed by oxidization, to improve adhesion of a Cr underlayer. Doerner et al., U.S. Pat. No. 5,302,434, found it difficult to obtain high coercivity on superpolished untextured NiP coated substrates, and proposed annealing in air to form a nickel oxide film on the surface of the NiP coating for enhanced coercivity. The smooth surface of the polished NiP layer was maintained through subsequent layers. The nickel oxide film was also said to reduce modulation by altering the crystallographic orientation of the underlayer and magnetic layer.

Other substrate materials have been employed, such as glasses, e.g., an amorphous glass, and glass-ceramic materials which comprise a mixture of amorphous and crystalline materials. Glass-ceramic materials do not normally exhibit a crystalline surface. Glasses and glass-ceramics generally exhibit high resistance to shocks. The use of glass-based materials, such as glass-ceramic materials, is disclosed by Hoover et al., U.S. Pat. No. 5,273,834.

Magnetic films exhibiting a bicrystal cluster microstructure have been the subject of recent investigations, due to an expected high coercivity, low noise, and high remanent squareness. However, bicrystal cluster magnetic films have not proved to be commercially feasible. Wong et al. (IEEE Trans. Magn., MAG-27, p. 4733, 1991), Mirzamaani et al. (J. Appl. Phys., 69, p. 5169, 1991), Min and Zhu (J. Appl. Phys., 75, p. 6129, 1994), Ding and Zhu (IEEE Trans. Magn., MAG-30, p. 3978, 1994) and Futamoto et al. (IEEE Trans. Magn., MAG-30, p. 3975, 1994) successfully produced bicrystal media on single crystal substrates. Ye and Zhu employed computers to simulate a bicrystal structure (J. Appl. Phys., 75, p. 6135, 1994). However, the production of actual bicrystal cluster media corresponding to the computer generated ideal microstructure of Ye and Zhu has been elusive.

Bicrystal cluster structures were produced in Cr/Co alloys deposited on NiP coated Al substrates by Nolan et al. (J. Appl. Phys., 73, p. 5566, 1993), Peng et al. (JA-01, Intermag Conference, San Antonio, Tex., April 1995) and Hosoe et al. (JA-02, Intermag Conference, San Antonio, Tex., April 1995). See also Ding et al. "Fabrication and Recording Performances of Bicrystal Disks on GaAs Substrates", Journal of The Magnetics Society of Japan, Vol. 18, Supplement, No. S1 (1994) and Ding et al., "Experimental Study on Recording and Track Edge Characteristics of Bicrystal Thin Film Media", IEEE Trans. Magn., MAG-31, p. 2827, 1995. However, magnetic recording media comprising a bicrystal cluster microstructure have not achieved any practical utility in the marketplace, presumably due to costly single crystal substrates and complex production requirements.

There exists a need to produce magnetic rigid disk media for longitudinal recording with low medium noise and high coercivity. There also exists a need to implement the theoretical advantages of bicrystal cluster media for commercial applications in a cost-effective manner.

DISCLOSURE OF THE INVENTION

The object of the present invention is a magnetic recording medium exhibiting low noise and high coercivity.

Another object of the present invention is a magnetic recording medium comprising a magnetic layer having a bicrystal cluster microstructure.

Additional objects, advantages and other features of the invention will be set forth in part in the description which follows and in part will become apparent to those having ordinary skill in the art upon examination of the following or may be learned from the practice of the invention. The objects and advantages of the invention may be realized and obtained as particularly pointed out in the appended claims.

According to the present invention, the foregoing and other objects are achieved in part by a magnetic recording medium comprising: a substrate comprising a glass or a glass-ceramic material; a seed layer on the substrate; an underlayer on the seed layer; and a magnetic layer on the underlayer; wherein the magnetic layer comprises a bicrystal cluster microstructure.

Another aspect of the present invention is a magnetic recording medium comprising: a substrate comprising a glass or a glass-ceramic material; a surface-oxidized seed layer on the substrate; an underlayer, having a (200) crystallographic texture, on the seed layer; and a magnetic layer on the underlayer; wherein, the magnetic layer comprises a bicrystal cluster microstructure, and the magnetic recording medium exhibits a signal-to-noise ratio greater than about 15 dB measured at 127 KFCI (thousand flux reversals per inch).

Additional objects and advantages of the present invention will become readily apparent to those skilled in this art from the following detailed description, wherein embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE INVENTION

The present invention provides a magnetic recording medium having high coercivity, high remanent squareness and, significantly, low medium noise, suitable for commercial applications in an efficient and cost-effective manner. Magnetic recording media produced in accordance with the present invention exhibit signal-to-noise ratios in excess of about 15 dB, including in excess of about 20 dB measured at 127 KFCI. Such highly desirable magnetic recording media are achieved by depositing and epitaxially growing a magnetic alloy layer having a bicrystal cluster microstructure. Significantly, in accordance with the present invention, a magnetic alloy film having a bicrystal cluster microstructure is achieved in a highly efficient, inexpensive and simplified manner without the requirement for a single crystal substrate. The present invention provides a magnetic recording medium comprising a magnetic alloy layer exhibiting a bicrystal cluster microstructure on a substrate of a glass or a glass-ceramic material.

A bicrystal cluster microstructure, as formed in the present invention, is characterized by clusters of multiple magnetic crystallites, each cluster epitaxially grown on a single grain of an underlayer. In bicrystal cluster layers, polycrystal magnetic alloy layers exhibit a preferred orientation. In employing a Co-based alloy, (11.0) planes exhibit a preference for alignment parallel to the layer plane. In each cluster, the C axes of Co-based alloy subgrains lie along two orthogonal directions. The C axes of subgrains of different clusters are randomly distributed in the film plane. See the Ding et al. publication previously mentioned.

In accordance with the present invention, a thin magnetic alloy layer having a bicrystal cluster microstructure is formed employing a substrate made of a relatively inexpensive glass or glass-ceramic material. The obtainment of a bicrystal cluster microstructure in the magnetic alloy layer is achieved by controlling the crystallographic orientation of the underlayer. For example, it has been found that an underlayer, such as a Cr underlayer, formed with a (200) crystallographic orientation, induces a bicrystal cluster microstructure in a magnetic alloy layer deposited and epitaxially grown thereon. The underlayer, however, is not confined to Cr, but can comprise a chromium vanadium alloy (CrV) or a chromium titanium alloy (CrTi). If the underlayer texture is (110) vis-à-vis (200), a bicrystal cluster microstructure will not be developed in a magnetic alloy layer deposited and epitaxially grown thereon.

Figure 2:
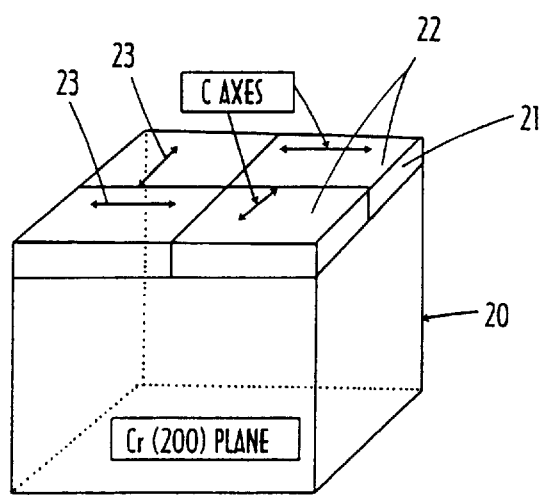
FIG. 2 schematically depicts a bicrystal cluster microstructure in accordance with the present invention.

A bicrystal cluster microstructure obtained in the present invention is depicted in FIG. 2, wherein Cr underlayer 20 is shown with a Co-based alloy layer 21 formed thereon. Co-alloy layer 21 comprises bicrystal clusters 22 formed on the Cr underlayer having a (200) crystallographic texture or orientation. Arrows 23 designate the C axes of the deposited Co-based alloy microstructure. The formation of an underlayer with a (200) crystallographic orientation enables the obtainment of a bicrystal cluster microstructure in a magnetic alloy layer epitaxially grown on the underlayer. For example, by providing a Cr underlayer with a (200) crystallographic orientation, a Co-based alloy magnetic layer epitaxially grown thereon exhibits a preferred orientation, i.e., (11.0) planes exhibit a preference to be parallel to the layer plane. Cr (200) planes also prefer to be aligned parallel to the layer plane. Thus, a Co-based alloy layer consisting of polycrystallites is epitaxially grown on a polycrystal Cr underlayer with the C axes of the subgrains of different clusters randomly distributed along two orthogonal directions in the layer plane. Therefore, the present invention does not require a single crystal substrate. Rather, a glass or glass-ceramic material can be employed and a seed layer provided thereon which enables the deposition of an underlayer having a (200) crystallographic orientation which, in turn, enables the formation of a magnetic layer exhibiting a bicrystal cluster microstructure on the underlayer.

In an embodiment of the present invention, an underlayer having a (200) crystallographic orientation is achieved by providing a seed layer on a glass or glass-ceramic substrate, which seed layer induces a (200) crystallographic orientation in the underlayer. The seed layer can be any material capable of inducing a (200) crystallographic orientation in an underlayer deposited thereon. For example, the seed layer can comprise a material such as $Ni_3P$, NiP, or tantalum (Ta).

It has been found advantageous to provide the seed layer with a surface roughness to facilitate inducement of a (200) crystallographic orientation of the overlying underlayer. The seed layer can be provided with an appropriate surface roughness by roughening, as by acid etching or oxidation. Thus, in an embodiment of the present invention, a seed layer is deposited on a glass or glass-ceramic material substrate and oxidized in accordance with the technique disclosed in copending application Ser. No. 08/586,529 now U.S. Pat. No. 5,733,370, the entire disclosure of which is incorporated herein by reference. For example, oxidation can be conducted in an oxidizing environment, such as air, oxygen or a mixture of an inert gas and oxygen.

Figure 1:
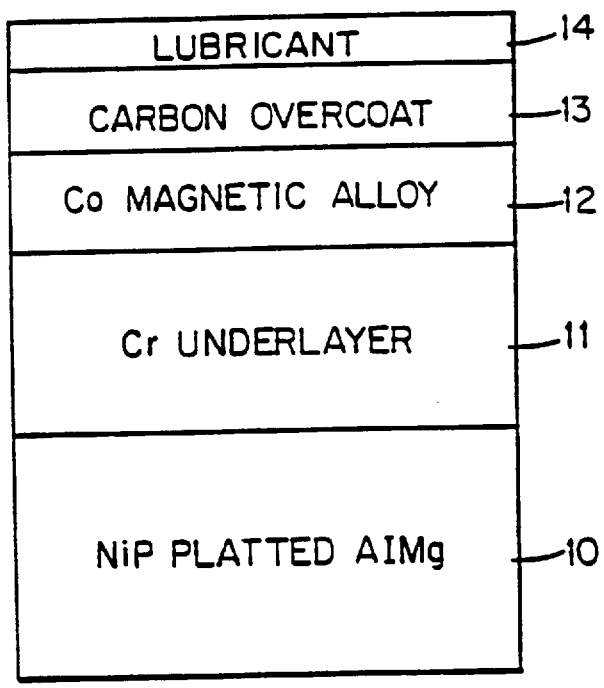
FIG. 1 schematically depicts a conventional magnetic recording medium structure.
Figure 3:
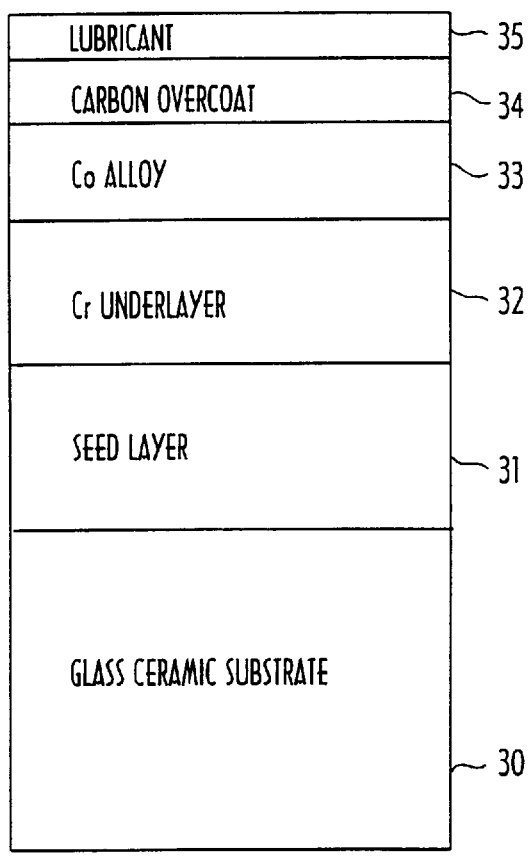
FIG. 3 schematically depicts a magnetic recording medium structure in accordance with an embodiment of the present invention.

An embodiment of the present invention is illustrated in FIG. 3, wherein a substrate 30, such as a glass-ceramic substrate, is provided with an oxidized seed layer, such as $Ni_3P$ or NiP. An underlayer 32, such as Cr, is deposited thereon, and magnetic alloy layer 33, such as a Co-alloy, is epitaxially grown on underlayer 32 and exhibits a bicrystal cluster microstructure. As in the conventional magnetic recording media shown in FIG. 1, an overcoat 34, such as carbon, is provided on magnetic alloy layer 33, and a lubricant 35 is provided on overcoat 34.

The use of a seed layer 31 in connection with a glass or glass-ceramic substrate is totally different from the use of a conventional NiP plating on Al-alloy substrates. An NiP plating is provided on Al-alloy substrates primarily for increased hardness and to provide a surface amenable for texturizing, wherein the subsequently deposited conformal layers engender a desired external surface roughness. However, in the present invention, a seed layer is provided to reduce the emissivity of the substrate and to affect the structure of the underlayer so that it exhibits a (200) crystallographic orientation. Thus, the seed layer of the present invention need only have a thickness of about 200Å to about 2000Å, such as about 500Å(0.05 micrometers), and can be applied by physical vapor deposition.

The substrates employed in the claimed invention can advantageously comprise any of various glass or glass-ceramic materials, such as those which have been employed as substrate for magnetic recording media. Glass-ceramic materials are typically formed by a heat treatment of the surface to form a thin crystallized layer of ceramic thereon. Some forms of conventional glass-ceramic material are referred to as "Ohara glass". The substrate can have a surface average roughness Ra of about 2 Å to about 100 Å, such as about 5 to about 20.

The underlayer employed in the present invention can comprise any of various materials conventionally employed as an underlayer in the production of magnetic recording media, such as Cr, CrV or CrTi. The underlayer can be deposited in any conventional manner, as by chemical vapor deposition, physical vapor deposition, or sputtering. The thickness of the underlayer should be sufficient to affect the crystallographic orientation of the magnetic alloy layer deposited thereon, and can be optimized in a particular situation. It has been found that an underlayer thickness of about 100Å to about 2000Å, such as about 550Å, is sufficient.

The magnetic layer of the present invention can comprise any magnetic alloy conventionally employed in the production of magnetic recording media. Such alloys include, but are not limited to, Co-base alloys such as cobalt-chromium (CoCr), cobalt-chromium-tantalum (CoCrTa), cobalt-nickel-chromium (CoNiCr), cobaltchromium-platinum-tantalum (CoCrPtTa), cobalt-chromiumplatinum (CoCrPt), cobalt-nickel-platinum (CoNiPt), cobalt-nickel-chromium-platinum (CoNiCrPt) and cobaltchromium-platinum-boron (CoCrPtB). The thickness of the magnetic layer is consistent with conventional practices in manufacturing magnetic recording media. A Co-base alloy having a thickness of about 100Å to about 1000Åthick, such as about 200Å to 500Å, has been found suitable.

Magnetic recording media manufactured in accordance with the present invention exhibit high coercivity and, significantly, low medium noise. In accordance with the present invention, coercivities can be achieved ranging from 1000 to 10000 Oersteds, such as 1700 to 3000 Oersteds. In addition, magnetic recording media are obtained wherein the product of the remanent magnetization and film thickness (Mrt) is about 0.4 to about 3.0 memu/$Cm^2$, such as about 0.6 to about 1.2 memu/$cm^2$ for magnetoresist media, and about 1.8 to about 2.8 memu/$cm^2$ for inductive media.

As in conventional magnetic recording media, a protective overcoat can be deposited on the magnetic layer by any conventional means, such as sputtering. Overcoats can comprise carbon, including hydrogenated carbon, silicon carbide (SiC), zirconium oxide ($ZrO_2$) or a carbon nitride (CN). The overcoat is provided in a thickness suitable to protect the underlying layers. An overcoat having a thickness of about 50 Å to about 300 Å, such as about 100 Å to 200 Å has been found suitable.

As in conventional magnetic recording media, a layer of a lubricant can be applied on the overcoat. The lubricant can be provided in any suitable thickness. A lubricant thickness of about SA to 50 Å, such as about 10 Åto about 20 Å, has been found suitable.

EXAMPLE

In order to demonstrate the effectiveness of the present invention, comparison testing was conducted on two different magnetic recording media produced under identical conditions with identical equipment except as otherwise indicated. Glass-ceramic substrates were employed having an average surface roughness Ra of 10 Å on which were sequentially sputter deposited a seed layer of $Ni_3P$, a Cr underlayer, a Co-based magnetic alloy and a carbon overcoat. The Co-based magnetic alloy comprised 15 at. % Cr, 11 at. % Pt, 4 at. % Ta, and the balance Co. The $Ni_3P$ seed layer had a thickness of about 500 Å, the Cr underlayer a thickness of about 550 Å, the Co-based magnetic alloy a thickness of about 240 Å and the protective carbon layer a thickness of about 190 Å. The seed layer, underlayer and magnetic alloy layers were sputtered deposited at about 10 m Torr of argon pressure. The sputter power density of $Ni_3P$ was 10.3 Watts/$cm^2$; the sputter power density of the Cr underlayer was 7.3 Watts/$cm^2$; and the sputter power density of the Co-based magnetic alloy was 13.2 Watts/$cm^2$. In all cases, no substrate bias was employed.

In Sample 1, representative of the present invention, the seed layer was oxidized; whereas, in (Comparative) Sample 2, the seed layer was not oxidized. This was essentially the only difference between Sample (Comparative) Sample 2. Photographs and electron diffraction patterns of Co-based magnetic alloy layers of Sample 1 and (Comparative) Sample 2 were obtained employing high resolution transmission electron microscopy (HRTEM). The Co-based alloy magnetic layer of Sample 1, according to the present invention, exhibited a bicrystal cluster microstructure; whereas, the Co-base magnetic alloy of (Comparative) Sample 2 did not exhibit a bicrystal cluster microstructure.

The diameter of the plane view image of the bicrystal cluster of Sample 1 was measured at about 150 Å–300 Å. Although the shape of the image is not a perfect circle, the term "diameter" of the cluster and the subgrain is employed to represent the length of the line connecting the farthest two points in the boundary of the image of the cluster and subgrain. The diameter of the plane view image of the subgrain is about 50 Å to about 200 Å. No such bicrystal clusters are apparent from (Comparative) Sample 2.

Figure 4:
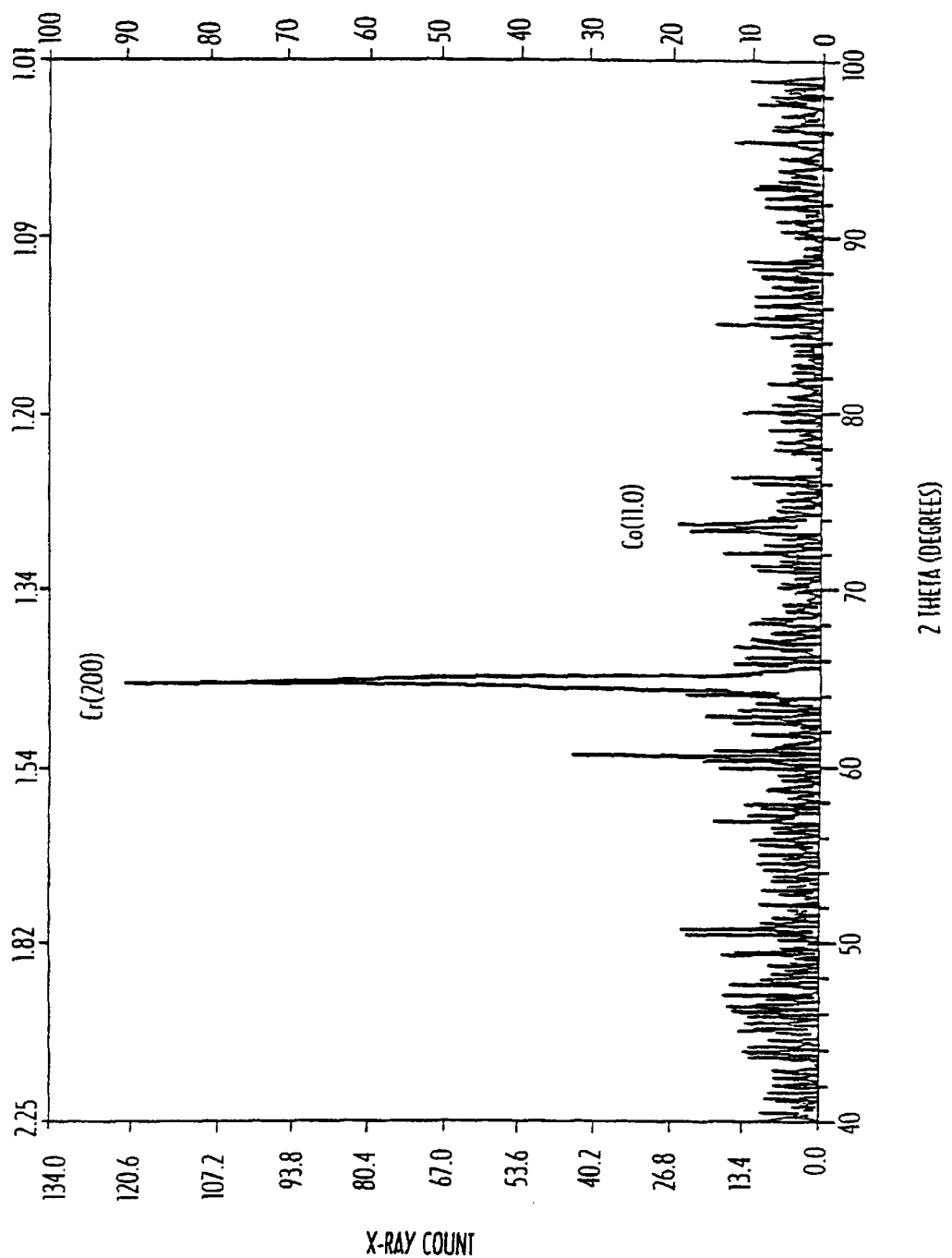
FIG. 4 represents an X-ray diffraction curve of a Cr/Co alloy film exhibiting a bicrystal cluster microstructure in accordance with the present invention.
Figure 5:
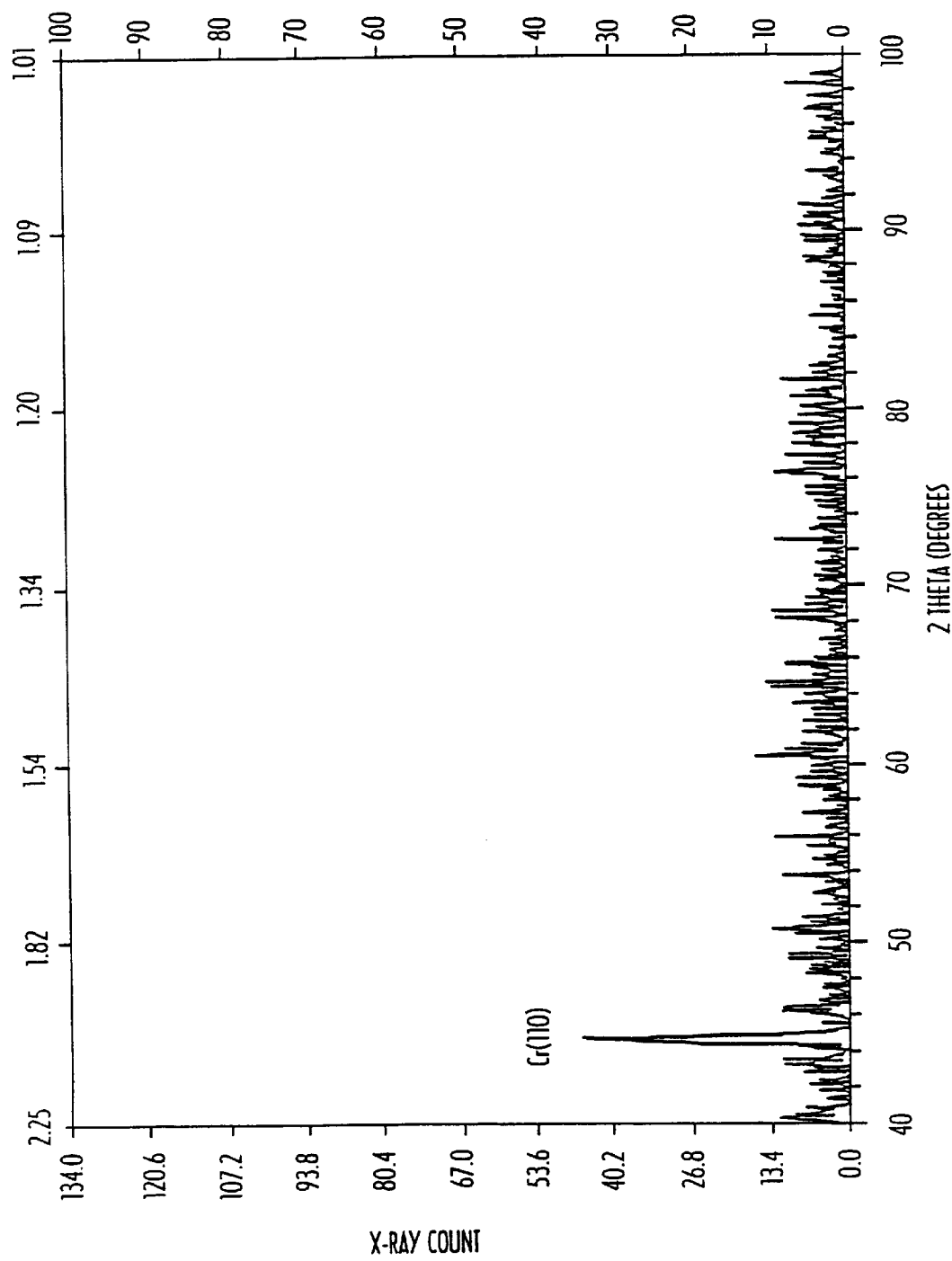
FIG. 5 represents an X-ray diffraction curve of a Cr/Co alloy film which does not exhibit a bicrystal cluster microstructure.

FIG. 4 and FIG. 5 are X-ray diffraction curves of Sample 1 and (Comparative) Sample 2, respectively. It is apparent from FIG. 4 that the magnetic recording medium of the present invention comprises a Cr underlayer having a (200) crystallographic orientation and a Co-based alloy magnetic layer thereon having a bicrystal cluster microstructure. The only Cr peak found in the X-ray diffraction pattern of the bicrystal cluster media shown in FIG. 4 is (200); the (110) Cr peak is not visible. However, as apparent from FIG. 5, the Cr underlayer of (Comparative) Sample 2, wherein the Co-based alloy magnetic layer did not exhibit a bicrystal cluster microstructure, has a crystallographic orientation of (110).

Figure 6:
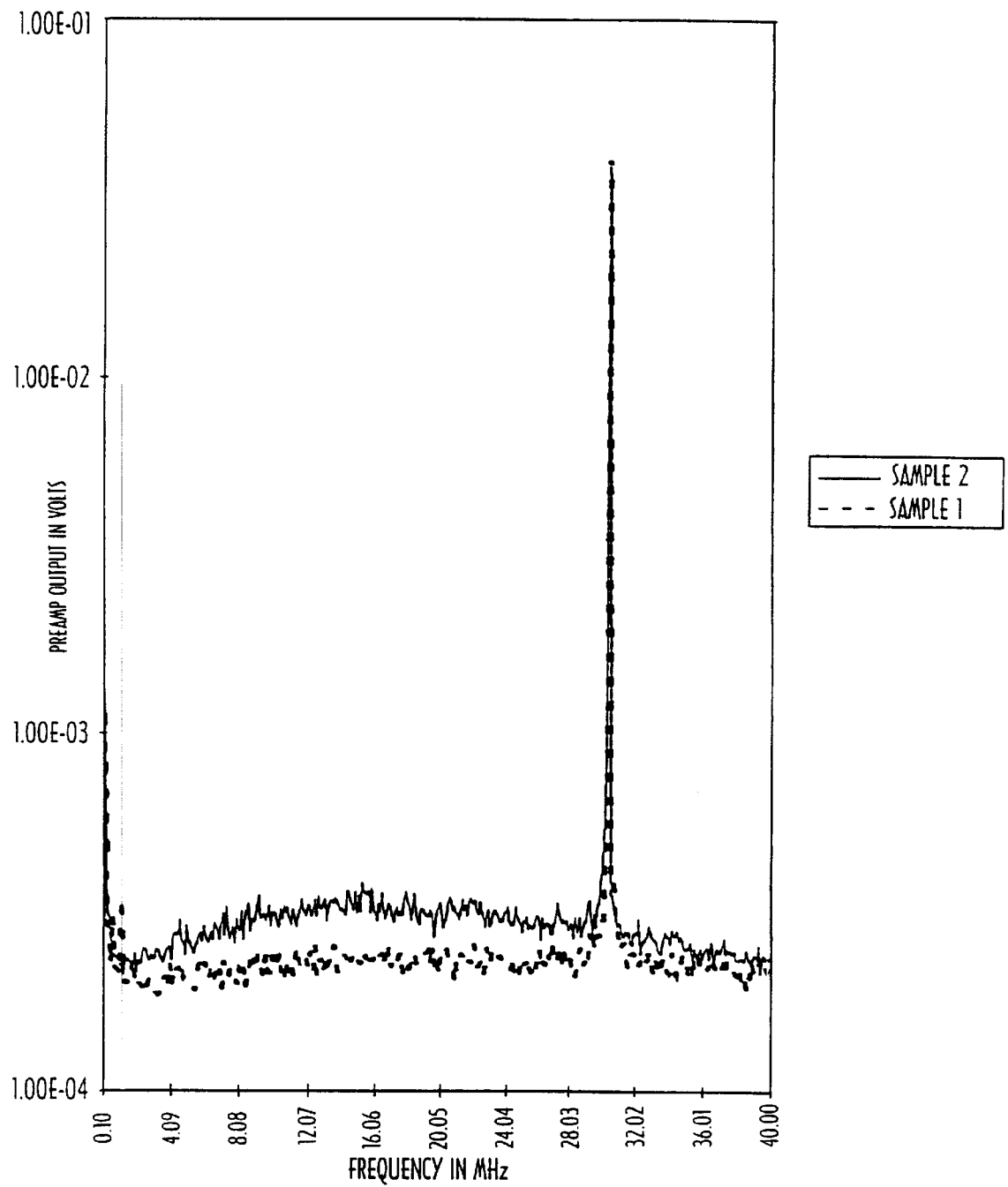
FIG. 6 represents a comparison of the signal and AC erased noise spectra for samples with and without a bicrystal cluster microstructure.

Advantages of the present invention are apparent from FIG. 6 which presents a comparison of the signal and alternating current (AC) erased noise spectra of Sample 1 and (Comparative) Sample 2 measured at 30.4 MHz with a HP 3588 Å spectrum analyzer and Guzik 312 spin stand using an inductive write head and a magnetoresist (MR) playback head. Sample 1 exhibits a bicrystal cluster microstructure; whereas, (Comparative) Sample 2 does not exhibit a bicrystal cluster microstructure. The narrow band noise, which is due to the texture of the substrates, and the signal output of both samples are basically the same. The medium transition noises, however, are significantly different. The signal-to-medium noise ratio (SNR) of Sample 1 and (Comparative) Sample 2 are 20.2 dB and 15.2 dB, respectively. Thus, Sample 1 in accordance with the present invention enjoyed an improvement in SNR of 5 dB, which reflects a 78 % improvement in performance.

In conducting the comparative testing, the deposition conditions of the $Ni_3P$ seed layer, Cr underlayer, Co-base alloy magnetic layer and carbon overcoat of Sample 1, such as target power, argon pressure, pallet transfer speed, are identical with those of (Comparative) Sample 2, respectively, except for the deposition temperature. Both samples have similar coercivity (Hc) and the product of remanent magnetization and film thickness (Mrt). The substrate temperature was slightly different due to an adjustment to obtain a similar coercivity for each Sample. The Cr underlayer of (Comparative) Sample 2 was grown on a freshly deposited $Ni_3P$ seed layer; whereas, in Sample 1 representative of the present invention, the surface of the $Ni_3P$ layer was oxidized. Oxidation was conducted at a temperature of about 100° C. in an atmosphere of about 10m Torr of about 80 % Ar and about 20 % oxygen for about one minute.

Table 1 shows the magnetic properties of Sample 1 and (Comparative) Sample 2 measured with a remanent moment magnetometer (RMM).

TABLE 1

| Sample | Hcr (Oe) | Mrt (memu/cm²) |
|---|---|---|
| Sample 1 | 2395 | 0.80 |
| Sample 2 | 2440 | 0.79 |

Sample 1 exhibits a 5 dB improvement in signal-to-medium-noise ratio vis-à-vis (Comparative) Sample 2, although both Samples contain the same Co-based magnetic alloy and exhibit a similar coercivity and Mrt. The difference in medium noise of these two media is attributable to the microstructure of the Co-based alloy magnetic layer. The medium noise of the Co-based alloy magnetic layer exhibiting a bicrystal cluster microstructure is significantly reduced vis-à-vis the same Co-based alloy magnetic layer which does not exhibit a bicrystal cluster microstructure.

The present invention is not limited to the specific examples disclosed herein or specific materials employed. The magnetic recording media of the present invention can comprise any of various types of glass or glass-ceramic substrates, and various types of magnetic alloy layers, including various Co-based alloy magnetic layers. The underlayer of the present magnetic recording media is not limited to Cr, but can comprise various other materials, including metals exhibiting a cubic polycrystal structure, such as CrV or CrTi. The magnetic recording media of the present invention enjoy utility in various applications, particularly those applications wherein high density is required, such as a magnetic rigid disk medium for longitudinal recording.

Only certain embodiments of the invention and but a few examples of its versatility are shown and described in the present disclosure. It is to be understood that the invention is capable of use in various other combinations and environments and is capable of changes or modifications within the scope of the inventive concept as expressed herein.

We claim:

1. A magnetic recording medium comprising:
   a substrate comprising a glass or a glass-ceramic material;
   a seed layer on the substrate comprising a material selected from the group consisting of $Ni_3P$, NiP, and Ta;
   an underlayer, having a (200) crystallographic orientation, on the seed layer; and
   a magnetic layer on the underlayer; wherein the magnetic layer comprises a bicrystal cluster microstructure and the surface of the seed layer adjacent the underlayer is roughened.

2. The magnetic recording medium according to claim 1, wherein the seed layer has a thickness of about 200 Å to about 2000 Å.

3. The magnetic recording medium according to claim 1, wherein the surface of the seed layer adjacent the underlayer is oxidized.

4. The magnetic recording medium according to claim 1, wherein the surface of the seed layer adjacent the underlayer is roughened by etching.

5. The magnetic recording medium according to claim 1, wherein the ratio of peak intensity of Cr (200) peak to that of Cr (110) peak, measured with an X-ray diffractometer (XRD) in the theta-2 theta mode, is not less than 10.

6. The magnetic recording medium according to claim 2, wherein the thickness of the seed layer is about 500 Å.

7. The magnetic recording medium according to claim 1, wherein the substrate has a surface average roughness Ra of about 2 to about 100 Å.

8. The magnetic recording medium according to claim 7, wherein Ra is about 5 to about 20 Å.

9. The magnetic recording medium according to claim 1, wherein the underlayer comprises Cr, CrV, or CrTi.

10. The magnetic recording medium according to claim 9, wherein the thickness of the underlayer is about 100 Å to about 2000 Å.

11. The magnetic recording medium according to claim 10, wherein the thickness of the underlayer is about 550 Å.

12. The magnetic recording medium according to claim 1, wherein the magnetic layer comprises a Co-based alloy.

13. The magnetic recording medium according to claim 12, wherein the Co-based alloy is selected from the group consisting of CoCr, CoCrTa, CoNiCr, CoCrPtTa, CoCrPt, CoNiPt, CoNiCrPt and CoCrPtB.

14. The magnetic recording medium according to claim 12, wherein the thickness of the magnetic layer is about 100 Å to about 100 Å.

15. The magnetic recording medium according to claim 14, wherein the thickness of the magnetic layer is about 200 Å to about 500 Å.

16. The magnetic recording medium according to claim 1, wherein the magnetic film has a coercivity of about 1000 to about 10000 Oersteds.

17. The magnetic recording medium according to claim 16, wherein the coercivity is about 1700 to about 3000 Oersteds.

18. The magnetic recording medium according to claim 1, wherein the product of remanent magnetization and film thickness (Mrt) is about 0.4–3.0 memu/cm².

19. The magnetic recording medium according to claim 18, wherein the medium is a magnetoresist medium and the product of remanent magnetization and film thickness Mrt is about 0.6 to about 1.2 memu/cm$^2$.

20. The magnetic recording medium according to claim 18, wherein the medium is an inductive medium, and the product of remanent magnetization and film thickness Mrt is about 1.8 to about 2.8 memu/cm$^2$.

21. The magnetic recording medium according to claim 1, further comprising an overcoat on the magnetic layer.

22. The magnetic recording medium according to claim 21, wherein the overcoat is sputtered deposited.

23. The magnetic recording medium according to claim 21, wherein the overcoat comprises a material selected from the group consisting of carbon, SiC, ZrO$_2$ and CN.

24. The magnetic recording medium according to claim 21, wherein the thickness of the overcoat is about 50 Å to about 300 Å.

25. The magnetic recording medium according to claim 24, wherein the thickness of the overcoat is about 100 Å to about 200 Å.

26. The magnetic recording medium according to claim 21, further comprising a lubricant layer having a thickness of about 5 Å to about 50 Å on the overcoat.

27. The magnetic recording medium according to claim 26, wherein the thickness of the lubricant is about 10 Å to about 20 Å.

28. The magnetic recording medium according to claim 1, wherein the medium is a thin film magnetic recording disk.

29. The magnetic recording medium according to claim 28, for longitudinal recording.

30. The magnetic recording medium according to claim 1, wherein the seed layer is sputtered deposited.

31. The magnetic recording medium according to claim 1, wherein the magnetic layer is sputtered deposited.

32. The magnetic recording medium according to claim 1, having a signal-to-noise radio in excess of about 15 dB measured at 127 KFCI.

33. The magnetic recording medium according to claim 32, having a signal-to-noise ratio in excess of about 20 dB measured at 127 KFCI.

34. The magnetic recording medium according to claim 1, wherein the magnetic layer comprises a Co alloy.

35. The magnetic recording medium according to claim 34, wherein the Co alloy is selected from the group consisting of CoCr, CoCrTa, CoNiCr, CoCrPtTa, CoCrPt, CoNiPt, CoNiCrPt and CoCrPtB.

36. A magnetic recording medium comprising: a substrate comprising a glass or a glass-ceramic material;

a surface-oxidized seed layer on the substrate comprising a material selected from the group consisting of Ni$_3$P, NiP, and Ta;

an underlayer having a (200) crystallographic orientation on the seed layer; and a magnetic layer on the underlayer; wherein, the magnetic layer comprises a bicrystal cluster microstructure, and the magnetic recording medium has a signal-to-noise ratio in excess of about 15 dB measured at 127 KFCI.

37. The magnetic recording medium according to claim 36, wherein the underlayer comprises Cr, CrV or CrTi.

38. The magnetic recording medium according to claim 36, having a signal-to-noise ratio in excess of about 20 dB measured at 127 KFCI.

39. A magnetic recording medium comprising:

a substrate comprising a glass or a glass-ceramic material;

a surface-oxidized seed layer on the substrate;

an underlayer, having a (200) crystallographic orientation, on the seed layer; and a magnetic layer on the underlayer; wherein the magnetic layer comprises a bicrystal cluster microstructure and the seed layer comprises a material selected from the group consisting of Ni$_3$P, NiP and Ta.

* * * * *